(12) United States Patent
Alisar et al.

(10) Patent No.: US 12,438,472 B2
(45) Date of Patent: Oct. 7, 2025

(54) POWER CONVERSION SYSTEM AND OPERATING METHOD

(71) Applicant: Siemens Gamesa Renewable Energy Innovation & Technology, S.L., Sarriguren (ES)

(72) Inventors: Ibrahim Alisar, Nuremberg (DE); Emilio David Rebollo López, Madrid (ES); José Luis Rodriguez Izal, Burlada (ES)

(73) Assignee: Siemens Gamesa Renewable Energy Innovation & Technology, S.L., Sarriguren (ES)

(*) Notice: Subject to any disclaimer, the term of this patent is extended or adjusted under 35 U.S.C. 154(b) by 0 days.

(21) Appl. No.: 18/703,547

(22) PCT Filed: Oct. 21, 2022

(86) PCT No.: PCT/EP2022/079369
§ 371 (c)(1),
(2) Date: Apr. 22, 2024

(87) PCT Pub. No.: WO2023/072751
PCT Pub. Date: May 4, 2023

(65) Prior Publication Data
US 2024/0421719 A1    Dec. 19, 2024

(30) Foreign Application Priority Data
Oct. 27, 2021 (EP) .................................... 21382968

(51) Int. Cl.
*H02J 3/38*         (2006.01)
*H02M 1/00*        (2007.01)
(Continued)

(52) U.S. Cl.
CPC ............ *H02M 5/4585* (2013.01); *H02J 3/38* (2013.01); *H02M 1/0054* (2021.05); *H02M 1/12* (2013.01); *H02J 2300/28* (2020.01)

(58) Field of Classification Search
CPC .... H02M 5/4585; H02M 1/0054; H02M 1/12; H02M 1/0048; H02M 1/00; H02M 5/458; H02J 3/38; H02J 2300/28
(Continued)

(56) References Cited

U.S. PATENT DOCUMENTS 7,327,588 B2    2/2008    Ollila
7,928,592 B2    4/2011    Wagoner et al.
(Continued)

OTHER PUBLICATIONS

Paul D. Judge et al. "2-Level Si IGBT Converter with Parallel Part-Rated SiC Converter Providing Partial Power Transfer and Active Filtering"; Jun. 17, 2019, pp. 1-7. (Year: 2019).*
(Continued)

*Primary Examiner* — Rexford N Barnie
*Assistant Examiner* — Xuan Ly
(74) *Attorney, Agent, or Firm* — Schmeiser, Olsen & Watts LLP

(57)    ABSTRACT

A power conversion system is provided, which system includes a first power converter including power electronic switches of a first type that are switchable to provide electric power conversion; and a second power converter connected in parallel to the first power converter. The second power converter includes power electronic switches of a second type that are switchable to provide electric power conversion. The second type is different from the first type. The second type of power electronic switches includes wide bandgap semiconductor switches. The system further includes a controller configured to operate the power conversion system in a first operating mode in which the second power converter is operated at a first switching frequency,
(Continued)

and in a second operating mode in which the second power converter is operated at a second switching frequency of the power electronic switches and the first power converter is operated to provide power conversion.

14 Claims, 4 Drawing Sheets

(51) Int. Cl.
　　*H02M 1/12*　　　(2006.01)
　　*H02M 5/458*　　　(2006.01)
(58) Field of Classification Search
　　USPC .......................................................... 307/82
　　See application file for complete search history.

(56) References Cited

U.S. PATENT DOCUMENTS

| | | |
|---|---|---|
| 9,118,184 B2 | 8/2015 | Wagoner |
| 9,450,514 B2 | 9/2016 | Purhonen et al. |
| 9,531,290 B2 | 12/2016 | Fulcher et al. |
| 10,291,111 B1 | 5/2019 | Ollila |
| 10,348,184 B2 | 7/2019 | Ali et al. |
| 10,680,531 B2 | 6/2020 | Lausarreta et al. |
| 2012/0243274 A1 | 9/2012 | Feng et al. |

OTHER PUBLICATIONS

PCT International Search Report and Written Opinion of International Searching Authority mailed Oct. 21, 2022 corresponding to PCT International Application No. PCT/EP2022/079369 filed Jan. 20, 2023.
Karthik Desingu—"Effective Utilization of Parallel-Connected Megawatt Three-Level Back-to-Back Power Converters in Variable Speed Pumped Storage Units," in IEEE Transactions on Industry Applications, vol. 55, No. 6, pp. 6414-6426, Nov.-Dec. 2019; 2019.
Chunwei Song—"Circulating current elimination scheme for parallel operation of common dc bus inverters," International Journal of Electrical Power & Energy Systems, vol. 63, 2014, pp. 17-29, ISSN 0142-0615, https://doi.org/10.1016/j.ijepes.2014.05.048; 2014.
Rui Li—"Parallel Operation of Full Power Converters in Permanent-Magnet Direct-Drive Wind Power Generation System," in IEEE Transactions on Industrial Electronics, vol. 60, No. 4, pp. 1619-1629, Apr. 2013; 2013.
Judge, D. Paul et al: "2-Level Si IGBT Converter with Parallel Part-Rated SiC Converter Providing Partial Power Transfer and Active Filtering"; 2019 20th Workshop on Control and Modeling for Power Electronics (COMPEL), IEEE; Jun. 17, 2019 (Jun. 17, 2019), pp. 1-7, XP033581302.
Ramkrishan Maheshwari—"Analysis and modelling of circulating current in two parallel-connected inverters," in IET Power Electronics, vol. 8, No. 7, pp. 1273-1283, 7 2015; 2015.
Chen, Weibin et al: "A New Hybrid Si/SiC CCM Totem Pole Bridgeless PFC Design Towards Optimal Performance and Cost Tradeoff"; 2021 IEEE Energy Conversion Congress and Exposition (ECCE), IEEE; Oct. 10, 2021 (Oct. 10, 2021), pp. 2203-2207, XP034019051.
Rod Jones—Optimised power converter for multi-MW direct drive permanent magnet wind turbines, Proceedings of the 2011 14th European Conference on Power Electronics and Applications, Birmingham, 2011, pp. 1-10.
Javier Roldan-Perez—"Robust Active Damping in LCL-Filter-Based Medium-Voltage Parallel Grid Inverters for Wind Turbines," in IEEE Transactions on Power Electronics, vol. 33, No. 12, pp. 10846-10857, Dec. 2018.; 2018.
Zhang, Chao et al: "A New PFC Design With Interleaved MHZ-Frequency GaN Auxiliary Active Filter Phase and Low-Frequency Base Power Si Phase"; IEEE Journal of Emerging and Selected Topics in Power Electronics, IEEE, Piscataway, NJ, USA; vol. 8, No. 1, Nov. 25, 2019 (Nov. 25, 2019), pp. 557-566, XP011769549.
She, Xu et al: "Review of Solid-State Transformer Technologiesand Their Application in Power Distribution Systems"; IEEE Journal of Emerging and Selected Topics in Power Electronics, IEEE, Piscataway, NJ, USA; vol. 1, No. 3, Sep. 1, 2013 (Sep. 1, 2013), pp. 186-198, XP011527621.
S.K. Khadem—"Parallel operation of inverters and active power filters in distributed generation system—A review", Renewable and Sustainable Energy Reviews, vol. 15, Issue 9, 2011, pp. 5155-5168, ISSN 1364-0321, https://doi.org/10.1016/j.rser.2011.06.011.; 2011.
L. Bede; "Comparison between grid side and inverter side current control for parallel interleaved grid connected converters," 2015 17th European Conference on Power Electronics and Applications (EPE'15 ECCE-Europe), Geneva, 2015, pp. 1-10.; 2015.
Bong Hyun Kwon—Fault Diagnosis of Open-Switch Failure in a Grid-Connected Three-Level Si/SiC Hybrid ANPC Inverter, Electronics, vol. 9, No. 399, pp. 1-18, Feb. 2020; 2020.
Bin Shi—"Parallel operation of voltage source inverters with minimal intermodule reactors," Conference Record of the 2004 IEEE Industry Applications Conference, 2004. 39th IAS Annual Meeting., Seattle, WA, USA, 2004, pp. 162, doi: 10.1109/IAS.2004. 1348402.
Wei, Baoze—"Cross-circulating current suppression method for parallel three-phase two-level inverters," 2015 IEEE 5th International Conference on Consumer Electronics—Berlin (ICCE-Berlin), Berlin, 2015, pp. 423-427; 2015.

\* cited by examiner

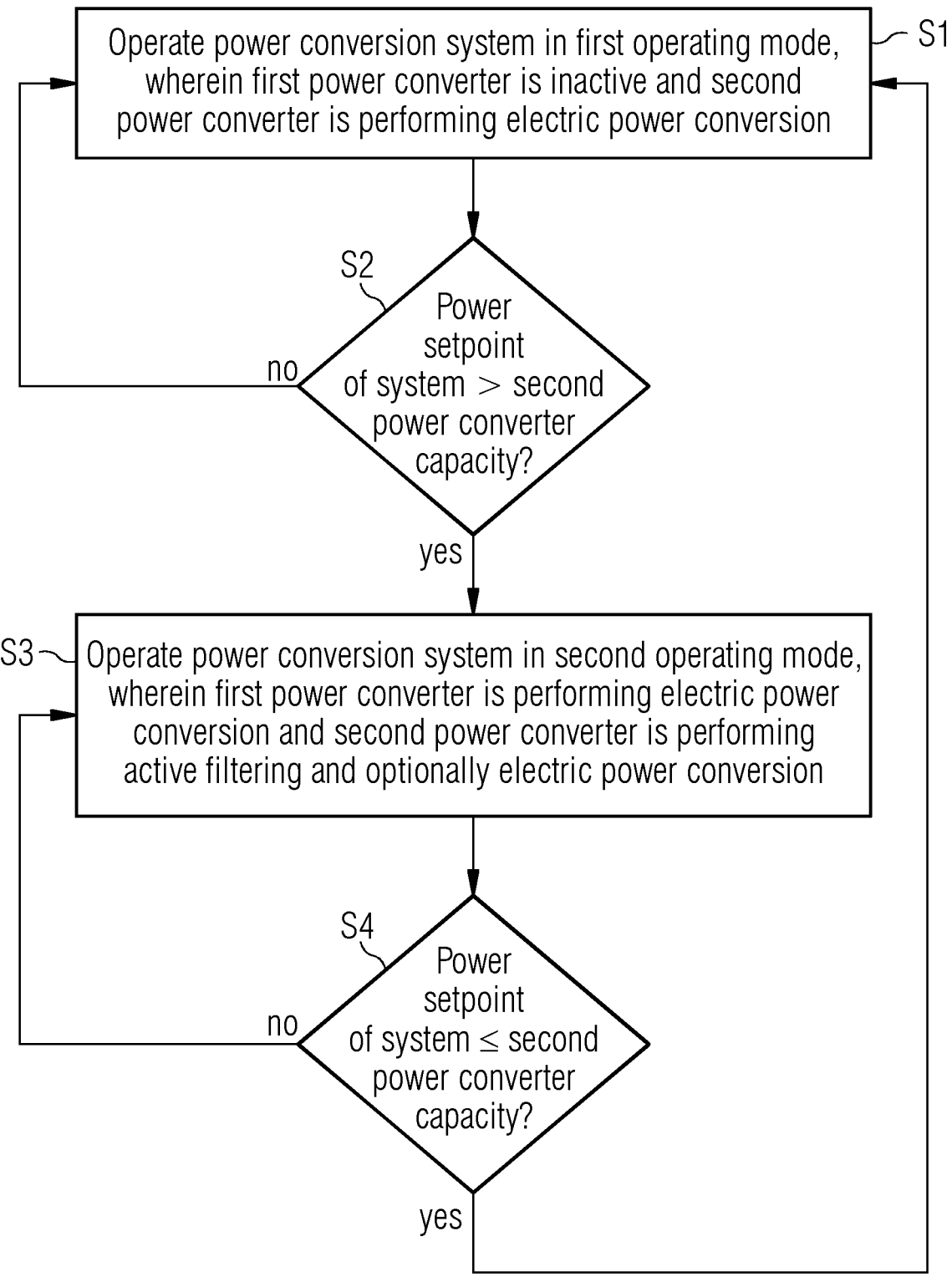

POWER CONVERSION SYSTEM AND OPERATING METHOD

CROSS-REFERENCE TO RELATED APPLICATIONS

This application claims priority to PCT Application No. PCT/EP2022/079369, having a filing date of Oct. 21, 2022, which claims priority to European Application No. 21382968.2, having a filing date of Oct. 27, 2021, the entire contents all of which are hereby incorporated by reference.

FIELD OF TECHNOLOGY

The following relates to a power conversion system configured to provide electrical power conversion and to a method of operating a power conversion system. It further relates to a wind turbine electrical power system comprising such power conversion system.

BACKGROUND

Power conversion systems are employed for a variety of applications. A prominent example is a wind turbine, which in a full-converter topology employs a power converter that is connected between the wind turbine generator and the power grid and that provides power conversion for essentially all of the generated electric power. In a doubly-fed induction generator (DFIG)-topology, a power converter is connected between the DFIG rotor and the power grid, and for example about 30 percent of the generated electric power may be converted by the power converter in such topology.

Respective power converters may for example comprise a full bridge topology and may use a pulse width modulation (PWM) scheme for power conversion. The power electronic switches used in such power converters do however suffer from switching and conduction losses. An approach for improving the efficiency of such power converters is the replacement of the conventional semiconductor switches with more efficient semiconductors, such as wide bandgap devices. However, such replacement results in a significant increase in the converter costs. The levelized cost of energy (LCOE) may thus not be improved with such replacement.

To address this problem, a hybrid topology may for example be employed. A Three Level-Active Neutral Point Clamped (3L-ANPC) topology may for example be used. FIG. 1 provides a respective example for such hybrid topology. The three-phase hybrid 3L-ANPC converter 300 of FIG. 1 employs four silicon-based insulated gate bipolar transistors (Si-IGBT) (311-314) and two silicon carbide MOSFETs (SiC-MOSFET) (321, 322) per phase. However, such topologies may also not result in the desired increase of efficiency and cost reduction. Furthermore, the filters for filtering the output of such power converters require relatively large inductances L, which increases the volume and weight of respective power converters. It is thus desirable to make respective power converters more efficient and less costly, and to reduce the volume and weight of such power converters.

The document "2-Level Si IGBT Converter with Parallel Part-Rated SiC Converter Providing Partial Power Transfer and Active Filtering", Paul D. Judge et al., 2019 20th Workshop on Control and Modeling for Power Electronics (COMPEL), IEEE, 17. June 2019, describes a power converter that employs a low frequency IGBT converter and a high frequency MOSFET converter that provide DC to AC conversion from a common DC bus. The high frequency converter can provide active filtering.

The document "Review of Solid-State Transformer Technologies and Their Application in Power Distribution Systems", Xu She et al., IEEE Journal of Emerging and Selected Topics in Power Electronics 1 (3), pages 186-198, September 2013, describes a plurality of different topologies for solid-state transformers (SSTs) and their applications, in particular for power distribution. Topologies are provided for conversion between HVAC, LVAC, HVDC and LVDC transmission systems.

SUMMARY

An aspect relates to a power converter with an improved efficiency in a cost-efficient way.

According to a first aspect, a power conversion system configured to provide electrical power conversion is provided. The power conversion system comprises a first power converter comprising power electronic switches of a first type that are switchable to provide electric power conversion and a second power converter connected in parallel to the first power converter, wherein the second power converter comprises power electronic switches of a second type that are switchable to provide electric power conversion, wherein the second type is different from the first type, and wherein the second type of power electronic switches comprises wide bandgap semiconductor switches. The power conversion system further comprises a controller configured to operate the power conversion system in a first operating mode in which the second power converter operates at a first switching frequency of the power electronic switches to provide power conversion, and in a second operating mode in which the second power converter operates at a second switching frequency of the power electronic switches and the first power converter operates to provide power conversion. The second switching frequency is higher than the first switching frequency.

Such power conversion system may provide a higher conversion efficiency. For example, at lower powers, the first operating mode may be used in which power conversion is performed by the wide bandgap semiconductor switches, which may reduce switching losses. At higher powers, the second operating mode may be used, which may for example allow an operation of the first power converter at lower frequency and may further allow the compensation of any resulting higher distortion by operation of the second power converter at the higher second switching frequency. Further, as the first power converter may comprise conventional semiconductor switches, the overall system costs may be reduced, in particular compared to a conventional converter that uses wide bandgap semiconductor switches. Such power conversion system may furthermore be particularly beneficial in situations in which only some of the capacity of the power conversion system is used. Wind speed can for example be approximated with a Weibull distribution, so that power production from a wind turbine generator may frequently use only part of the available power conversion capacity. Such partial power may be converted by the second power converter in the first operating mode, which may result in a highly efficient conversion without the need to provide wide bandgap semiconductor switches rated for the full power capacity. The power conversion system may accordingly provide several benefits.

The term switching frequency may in particular refer to the frequency at which the power electronic switches are switched to provide the power conversion, for example using Pulse Width Modulation (PWM). The power conversion system may be an AC-AC conversion system, yet other implementations, such as an AC-DC or DC-AC conversion system are also conceivable.

In an embodiment, in the second operating mode, the second power converter may be operated to provide active filtering of electric power converted by the first power converter. The second power converter may thus be operated as an active filter for the output of the first power converter. This may allow the first power converter to be operated at a lower switching frequency of its power electronic switches, thereby increasing the efficiency of the power conversion. It may further provide an improved quality of the converted electric power and may thus reduce the filtering requirements. Accordingly, the size of (passive) output filters may be reduced, for example the size of a filter inductor. This may reduce the volume and weight of the respective filters and thus of the conversion system.

In an embodiment, in the second operating mode, the first power converter may operate its power electronic switches at a third switching frequency to provide the power conversion. The third switching frequency may be lower than the second switching frequency of the second power converter, and it may be lower than the first switching frequency of the second power converter. In the second operating mode, the first power converter may thus operate at a significantly reduced switching frequency, resulting in a higher efficiency, while the second power converter may operate at the higher second switching frequency, and may thereby provide an efficient active filtering.

The third switching frequency may for example be lower than a nominal switching frequency of the first power converter. In an embodiment, the nominal switching frequency of the first power converter may lie between 2 and 4 kHz, e.g., at about 3 kHz, and the third switching frequency may lie in the range between 20 and 70 percent, in particular 40 to 60 percent, of the nominal frequency, e.g., at 1.5 kHz. By switching at only half the frequency, switching losses may be reduced significantly.

The second switching frequency may lie within a range of 5 kHz to 100 kHz. The first switching frequency may lie within a range of 0.1 to 5 kHz, e.g., 0.5 or 1 to 5 kHz. The second power converter may for example have a nominal switching frequency within the range of the lower first switching frequency, at which it may be operated in the first operating mode. The second power converter may thereby provide the converted power at sufficient power quality so that only a little filtering may be required. At the same time, due to the use of wide bandgap semiconductor switches, the conversion efficiency may be improved at the nominal switching frequency.

In the first operating mode, all power conversion by the power conversion system may be provided by the second power converter. The first power converter may be inactive with respect to power conversion. The first power converter may for example be disconnected or blocked, it may be operated in an idle mode or shut down. Providing all power conversion by the second power converter in the first operating mode may provide an increased efficiency.

The first power converter and/or the second power converter may comprise plural (2, 3, 4, or more) power converter modules connected in parallel. Such modularity may allow a relatively simple adjustment of the power conversion capacity of the conversion system, for example by using standardized and/or predesigned computer modules. Such modularity concept may allow a faster and more efficient design of a converter system for new applications, e.g., a new product, and may result in a reduced time to market. Test and certification procedures may likewise be reduced for such modular approach.

In an embodiment, the second power converter may comprise two or more power converter modules connected in parallel. In the second operating mode, at least one module of the second power converter may be operated to provide active filtering of electric power converted by the first power converter, and at least one module of the second power converter may be operated to provide electric power conversion. The capacity of the second power converter may accordingly extend beyond the capacity required for providing the active filtering for the first power converter, so that in the second operating mode, the remaining capacity may be employed for power conversion. The capacity of the second power converter may be adjusted by adding or removing converter modules. It should be clear that all converter modules of the second power converter may comprise respective wide bandgap semiconductor switches.

In an embodiment, the converter module providing the active filtering in the second operating mode may be operated at the (higher) second switching frequency and the converter module providing power conversion in the second operating mode may be operated at the (lower) first switching frequency.

In an embodiment, the controller may be configured to change the operation of at least one converter module of the second power converter from power conversion at the first switching frequency to active filtering at the second switching frequency when changing from the first operating mode into the second operating mode. In embodiments, the required number of converter modules of the second power converter may be operated as active filters in the second operating mode for achieving a predetermined power quality of the power converted by the first power converter after active filtering. Accordingly, the available capacity of the second power converter may be distributed in the second operating mode between active filtering and power conversion, so that best use may be made of the available capacity, thereby increasing the conversion efficiency of the overall system.

In an embodiment, the first power converter may comprise a first back-to-back converter comprising an intermediate DC bus, and/or the second power converter may comprise a second back-to-back converter comprising an intermediate DC bus. The first and/or second power converters may employ any known converter topology, such as a full bridge topology, e.g., a two level or three level full bridge. The first and/or second power converter may be configured to provide power conversion using PWM (pulse width modulation). The first and/or second power converters may be voltage source converters. A back-to-back converter may for example comprise a pair of converter units connected via the DC bus, such as a grid side converter unit and a generator side converter unit in a wind turbine application.

The DC bus of the first power converter may be independent from the DC bus of the second power converter. The DC buses of the first and second power converters may in particular be separate and distinct and may not be connected to each other.

If the first and/or second power converter is comprised of plural converter modules, each converter module may be a respective back-to-back converter. The converter modules of the respective power converter may have individual separate DC buses or may be connected to the same DC bus. Providing the converter modules as separate back-to-back converters with separate DC buses may allow an independent operation of the different converter modules. Each power converter may for example comprise 1, 2, 3, 4 or more converter modules.

In an embodiment, the first back-to-back converter may comprise a first converter unit and a second converter unit connected by the respective DC bus, and the second back-to-back converter may have a first converter unit and a second converter unit connected by the respective DC bus. In the second operating mode, the first converter unit of the second back-to-back converter may provide active filtering for the first converter unit of the first back-to-back converter, and the second converter unit of the second back-to-back converter may provide active filtering for the second converter unit of the first back-to-back converter. The second back-to-back converter may accordingly be operated as two active filters, providing active filtering for each side of the first back-to-back converter. An improved power quality may thus be achieved, and bidirectional operation, i.e., bidirectional power flow; may be achieved in the power conversion system.

The second power converter may have a predetermined power converting capacity, for example a maximal or nominal capacity for the power conversion. The controller may be configured to operate the power conversion system in the first operating mode if a demand or a setpoint for power conversion by the power conversion system is not above the power converting capacity, and to operate the power conversion system in the second operating mode if the demand or the setpoint for the power conversion by the power conversion system is above the power converting capacity. Accordingly, as long as the second power converter is capable of providing all the required power conversion, the first operating mode may be used, and at power requirements above that, switching into the second operating mode may occur. The capacity of the second power converter may thus be used efficiently, which increases the power conversion efficiency. The demand or setpoint may in particular be a total power setpoint (active power, reactive power or combined) for the power conversion system.

The first power converter may have a power converting capacity that is higher than a power converting capacity of the second power converter. This may further reduce the costs, as wide bandgap semiconductor switches only need to be provided for a lower power converting capacity, while the efficiency can still be kept high, as the first power converter can be operated at a lower frequency (in particular at the third switching frequency) in the second operating mode due to active filtering provided by the second power converter.

The power electronic switches of the first type may be Si-based power electronic switches. The power electronic switches of second type may be SiC (silicon carbide), AlN (Aluminium nitrate), GaN (Gallium nitrate), BN (Boron nitrate), ZnO (Zinc oxide)-based power electronic switches. Such types of switches may provide a better switching efficiency and may suffer mostly from conduction losses. The first power converter may not include wide bandgap semiconductor switches for power conversion. All power electronic switches of the second power converter providing the power conversion may be wide bandgap semiconductor switches. The semiconductor switches of the second type may for example be SiC-MOSFETs.

The first type of power electronic switches may comprise one or a combination of IGBTs (insulated gate bipolar transistor), MOSFETs (Metal Oxide Semiconductor Field Effect Transistor), thyristors, IGCTs (integrated gate-commutated thyristor), GTOs (gate turn-off thyristor), or other respective Si-based semiconductor switches.

The power conversion system may further comprise a filter on one or on both sides of the first power converter and/or the second power converter. The filter(s) may be configured to provide filtering of the converter output, in particular harmonic filtering. The filter(s) may be inductive, they may in particular include an inductance L. If the first and/or second power converter comprises plural converter modules, a filter may be provided on one or on each side of the respective module. By using parallel power converters and/or converter modules, plural smaller filters may be provided thus avoiding the need for one big filter on either or both sides. Plural smaller filters are better to handle and hence may further reduce the costs of the conversion system. A filter may thus be provided at the input and the output side of the respective power converter, although it should be clear that in view of a possible bidirectional power flow, input and output sides may change. The respective filter may in particular filter the PWM-signal generated by the respective power converter.

According to another aspect of embodiments of the present invention, a wind turbine electrical power system is provided. The wind turbine electrical power system comprises a power conversion system having any of the configurations described herein. The power conversion system is further configured to provide conversion of electrical power generated by a generator of the wind turbine electrical power system. In an embodiment, the power conversion system may be coupled between such generator and a power grid. The power conversion system may also be employed in other applications, for example with loads and/or power grids.

According to a further aspect of embodiments of the invention, a method of operating a power conversion system is provided. The power conversion system comprises a first power converter comprising power electronic switches of a first type that are switchable to provide electric power conversion, and a second power converter connected in parallel to the first power converter, wherein the second power converter comprises power electronic switches of a second type that are switchable to provide electric power conversion, wherein the second type is different from the first type, and wherein the second type of power electronic switches comprises wide bandgap semiconductor switches. In embodiments, the method comprises operating the power conversion system in a first operating mode in which the second power converter operates at a first switching frequency of the power electronic switches to provide power conversion; and operating the power conversion system in a second operating mode in which the second power converter operates at a second switching frequency of the power electronic switches and the first power converter operates to provide power conversion. The second switching frequency is higher than the first switching frequency. By such method, advantages similar to the ones outlined further above may be achieved.

In embodiments, the method may be performed by a power conversion system having any of the configurations described herein. In embodiments, the method may further comprise any of the steps described herein with respect to the power conversion system. Likewise, the power conversion system may be configured to carry out the method of any of the examples and implementations disclosed herein.

Changing between operation in first operating mode and the second operating mode may for example depend on the amount of electrical power to be converted, as explained above and further below. Changing to the second operation mode may for example occur upon a power setpoint for the power conversion system reaching or exceeding a power conversion capacity of the second power converter.

It is to be understood that the features mentioned above and those yet to be explained below can be used not only in the respective combinations indicated, but also in other combinations or in isolation, without leaving the scope of embodiments of the present invention. In embodiments, the features of the different aspects of the invention can be combined with each other unless noted to the contrary.

BRIEF DESCRIPTION

Some of the embodiments will be described in detail, with references to the following Figures, wherein like designations denote like members, wherein:

FIG. 6 is a flow diagram illustrating a method of operating a power conversion system in accordance with an embodiment of the invention.

DETAILED DESCRIPTION

Figure 1:
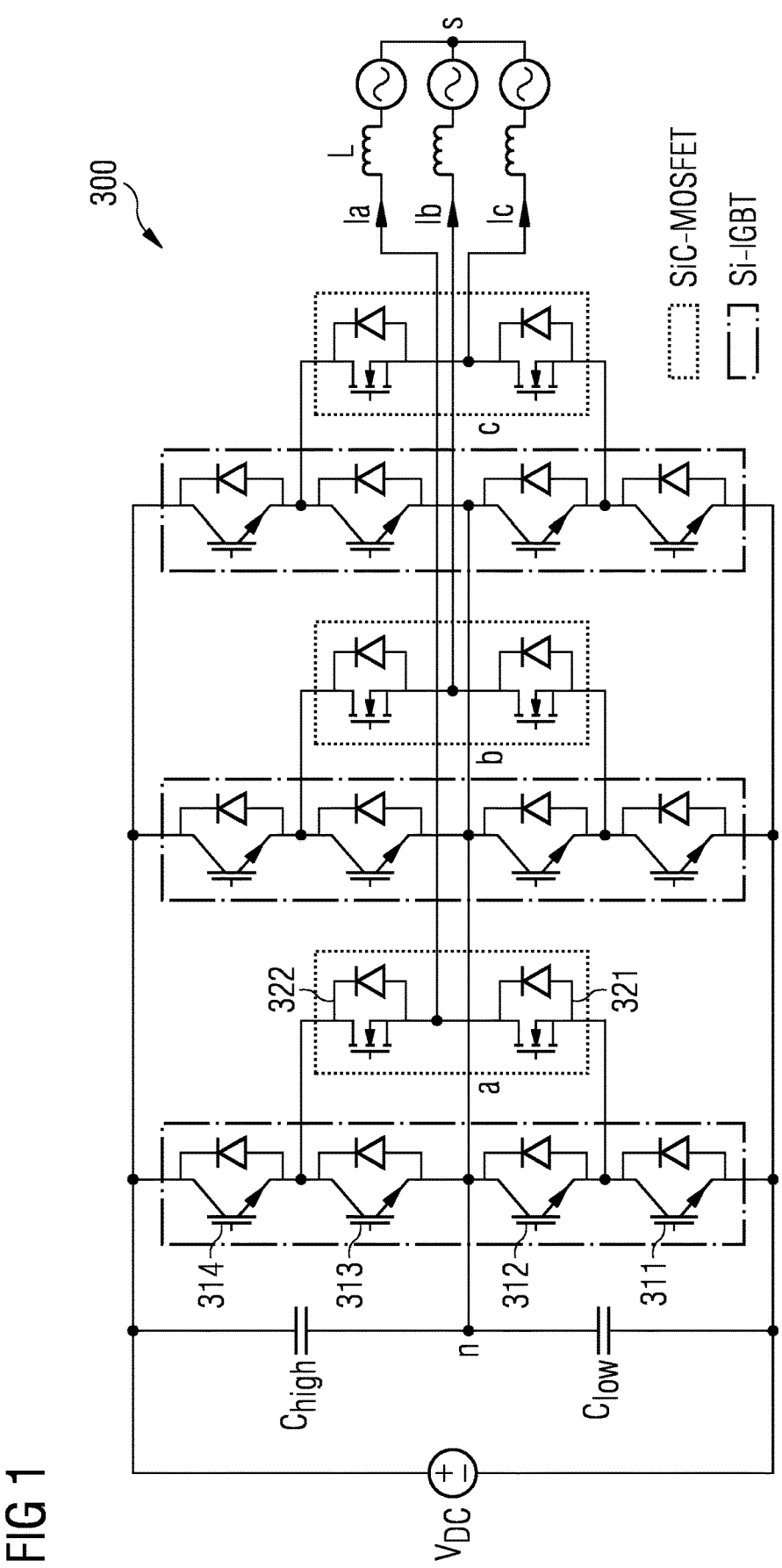
FIG. 1 is a schematic drawing showing a power converter having a hybrid 3L-ANPC topology.

In the following, embodiments and/or examples of the invention will be described in detail with reference to the accompanying drawings. It is to be understood that the following description of the embodiments is given only for the purpose of illustration and is not to be taken in a limiting sense. It should be noted that the drawings are to be regarded as being schematic representations only, and elements in the drawings are not necessarily to scale with each other. Rather, the representation of the various elements is chosen such that their function and general purpose become apparent to a person skilled in the art. As used herein, the singular forms "a," "an," and "the" are intended to include the plural forms as well, unless the context clearly indicates otherwise. The terms "comprising." "having." "including," and "containing" are to be construed as open-ended terms (i.e., meaning "including, but not limited to,") unless otherwise noted.

Figure 2:
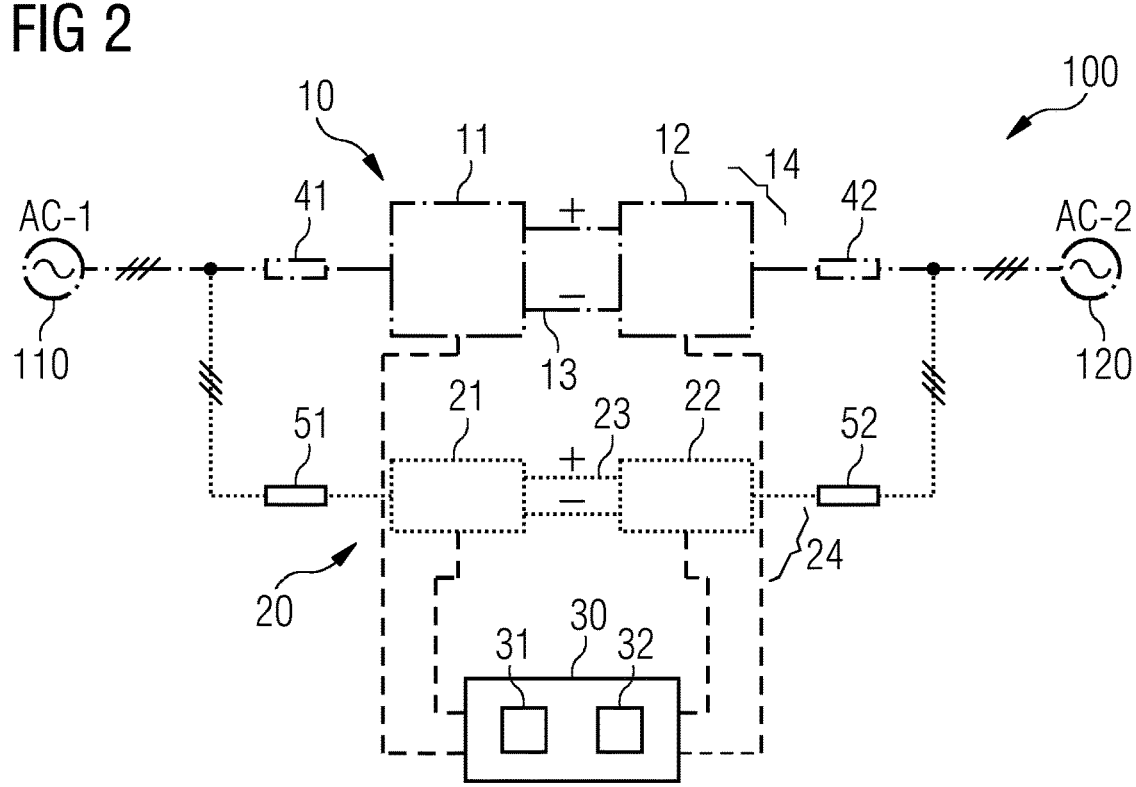
FIG. 2 is a schematic drawing showing a power conversion system according to an embodiment of the invention.

FIG. 2 schematically illustrates a power conversion system 100 according to an embodiment of the invention. Power conversion system 100 may comprise a first power converter 10 that may comprise a first converter unit 11 and a second converter unit 12 coupled by a DC bus 13. First and second converter units 11, 12 and DC bus 13 may form a first converter module 14, and the first power converter 10 may include further such converter modules connected in parallel. Such modular configuration of power converter 10 may allow a relatively straight forward configuration of the power converter 10 for different conversion capacities, for example by adding and/or removing power conversion modules 14. The first power converter 10 may have any of the converter topologies known in the conventional art and may in particular be implemented as a back-to-back converter as illustrated in FIG. 2. First power converter 10 may comprise plural power electronic switches that are operable to provide power conversion, for example using a PWM scheme. The power electronic switches of the first power converter may be Si-based semiconductor switches, such as conventional thyristors, MOSFETS, IGBTs or the like. First power converter 10 may in particular not comprise any wide bandgap semiconductor switches for performing power conversion. Accordingly, the first power converter 10 may be relatively cost efficient to implement, but may suffer from switching losses, which increase with switching frequency. First power converter 10 may have a nominal operating frequency, which may for example lie within a range of 0.5 to 5 KHz.

The power conversion system 100 may further include a second power converter 20 that is connected in parallel to the first power converter 10. The second power converter 20 may comprise a first converter unit 21, a second converter unit 22 and an intermediate DC bus 23 connecting the first and second converter units 21, 22. The first and second converter units 21, 22 and the intermediate DC bus 23 may form a converter module 24. Second power converter 20 may include 1, 2, 3 or more respective converter modules connected in parallel. The second power converter 20 may be implemented as a back-to-back converter. It may have any known converter topology, for example a full bridge topology, e.g., two level or three level full bridge. The second power converter may comprise plural power electronic switches for providing power conversion, which may be of a second type that is different from the type of power electronic switches of the first power converter 10. In embodiments, the power electronic switches of the second type of power converter 20 may be wide bandgap semiconductor switches. In an embodiment, they may be SiC-based or GaN-based semiconductor switches, they may for example be implemented as SiC MOSFETs.

The second power converter 20 may be configured to be operable for providing power conversion, wherein such operation may be more efficient due to the use of respective wide bandgap semiconductor switches. The second power converter 20 may likewise operate according to a PWM scheme to provide power conversion. A nominal switching frequency for power conversion provided by second power converter 20 may lie below 5 kHz, and may be considered as a lower first switching frequency. The second power converter 20 may further be configured to be operable at a higher second switching frequency, which may be above 5 kHz, e.g., between 5 kHz and 100 KHz.

The power conversion system 100 may further comprise a controller 30 that may be configured to operate the first and second power converters 10, 20 in accordance with different operating modes. Controller 30 may be configured to provide a first operating mode in which power conversion is performed only by the second power converter 20 but not by the first power converter 10. In such first operating mode, the semiconductor switches of the second power converter 20 may be operated at a nominal switching frequency for power conversion, corresponding to the first switching frequency. Power conversion system 100 may thus provide efficient power conversion up to the capacity provided by the second power converter 20 in the first operating mode.

The controller 30 may further be configured to operate in a second operating mode in which the first power converter 10 provides power conversion. In the second operating mode, the semiconductor switches of the second power converter 20 may be operated at the higher second switching frequency. In the second operating mode, the second power converter 20 may in particular be operated as an active filter for filtering electric power converted by the first power converter 10. Operation at the second switching frequency may allow the second power converter 20 to quickly compensate power variations in the output of the first power converter 10.

Figure 3:
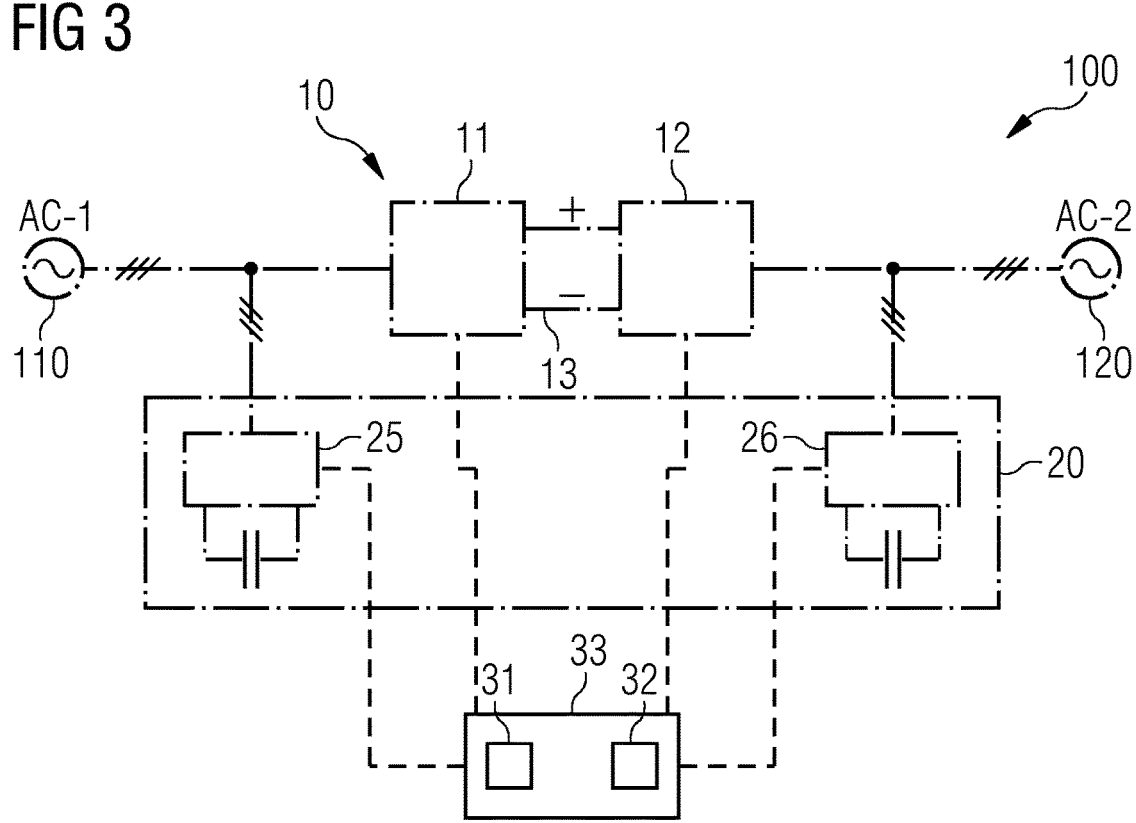
FIG. 3 is a schematic drawing showing a power conversion system according to an embodiment of the invention in which a second power converter is operated as two active filters.

FIG. 3 schematically illustrates such operation in the second operating mode. As can be seen, the first converter unit 21 of second power converter 20 may be operated as a first active filter 25 providing filtering for one side of the first power converter 10, in particular for the first converter unit 11 thereof. Similarly, the second converter unit 22 of second power converter 20 may be operated as an active filter 26 providing active filtering of power converted by the second converter unit 12 of the first power converter 10. Such active filtering may improve the quality of the power output by the first power converter 10. Accordingly, the first power converter 10 can be operated at a reduced switching frequency, as the resulting deterioration in the power quality is compensated by the active filtering. This in turn may reduce the switching losses within the first power converter 10. The power conversion efficiency of system 100 may thereby be improved, even though the first power converter 10 employs conventional Si-based semiconductor switches.

It should be clear that FIG. 3 only schematically illustrates the operation as two active filters 25, 26, but that the configuration of the second power converter 20 may in fact not change when switching between the first and second operating modes. The DC links of the two active filters 25, 26 are shown as separate elements in FIG. 3, although they may simply be disconnected or may be kept connected as shown with the DC bus 23 in FIG. 2.

It should further be clear that the second power converter 20 may comprise plural converter modules 24, and that it may be sufficient if in the second operating mode, one of the converter modules 24 is changed to operation at the higher second switching frequency, in particular to an operation as active filter. Depending on the active filtering required for the first power converter 10, more converter modules 24 may be switched to active filtering operation in the second operating mode. If the second power converter 20 comprises converter modules 24 not required for active filtering in the second operating mode, such converter modules may continue operation for the purpose of power conversion, i.e., they may continue operation at the lower first switching frequency. The best possible use may thus be made of the capabilities of the second power converter 20, which may result in an efficient power conversion.

In an embodiment, the second power converter 20 may comprise 2, 3, 4 or more converter modules 24 connected in parallel. When changing operation from the first operating mode to the second operating mode, it may be sufficient to transition operation of one converter module 24 from power conversion to active filtering. i.e., to the higher second switching frequency, wherein the remaining converter modules 24 may continue power conversion.

Turning back to FIG. 2, filters 41, 42 may be provided on either side of the first power converter 10. Respective filters 51, 52 may be provided on either side of the second power converter 20. These filters may be passive filters, they may in particular be harmonic filters for filtering the converter output. Filters 41 to 52 may for example comprise a filter inductance L. Since in the first operating mode, the second power converter 20 can operate efficiently at nominal operating frequency, at which the quality of the converted power is relatively high, filters 51, 52 do not need to be of particularly large size, in particular since the power conversion capacity of the second power converter 20 is only a fraction of the overall power converting capacity of system 100. Further, since in the second operating mode in which the first power converter 10 provides power conversion, the second power converter 20 provides active filtering, the size of filters 41, 42 may be reduced. The active filtering may improve the quality of the converted power significantly, so that filters 41, 42 can be downsized significantly compared to the filters required for a conventional power converter having the same converting capacity as the first power converter 10. Please note that although the filters 41, 42, 51, 52 are not shown in FIG. 3, they may certainly be present.

Furthermore, the power conversion system 100 does not need to be equipped with a single large filter at each converter side, but in view of the parallel structure, plural smaller filters may be employed. Furthermore, if the first and/or second power converter 10, 20 include plural converter modules 14, 24, respective filters may be provided on each side of the respective converter modules. Consequently, several small size filters may be used instead of one big filter. This may lead to advantages regarding filter costs, filter placement, and the like.

Figure 4:
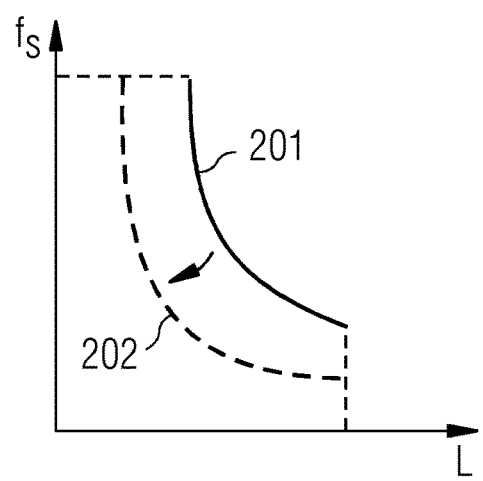
FIG. 4 is a schematic drawing showing a diagram illustrating a reduction in the frequency and/or filtering requirements for achieving a desired output power quality.

In general, if the switching frequency of a power converter is reduced, the quality of the converted electric power decreases, resulting in the need to increase filter size. This is illustrated in FIG. 4 with curve 201, which schematically illustrates the dependency between switching frequency $f_s$ and filter size L for a desired quality of the output power. By operating the second power converter 20 as an active filter in the second operating mode, the curve can be shifted, resulting in curve 202 that illustrates the relaxed requirements on switching frequency and/or filter size. The power conversion system 100 can accordingly be configured with a reduced switching frequency $f_s$ and/or the filters 41, 42 may be reduced in size, which may for example be performed in a design phase of the power conversion system 100. In an embodiment, if the switching frequency is maintained, the filter size may be reduced significantly. On the other hand, if the filter size is maintained, the switching frequency may be reduced significantly. It may likewise be possible to reduce both switching frequency and filter size, by a lesser amount. As illustrated in FIG. 4, there is an interplay between switching frequency and filter size, and the respective reduction may be chosen in accordance with the particular application of power conversion system 100.

Turning back to FIG. 2, the power conversion system 100 may be connected on one side to an AC system 110 and on the other side to an AC system 120. An AC system 110, 120 may for example be a generator, for example a wind turbine generator, a load, for example a motor, or a power grid. Power conversion system 100 may for example form part of a wind turbine electrical power system. It may be used for power conversion in a full converter topology or may be used for power conversion in a DFIG-topology. It may for example on one side be coupled to a permanent magnet synchronous generator or to a rotor of a DFIG, and may on the other side be coupled to a power grid, for example via a respective wind turbine transformer.

Figure 5:
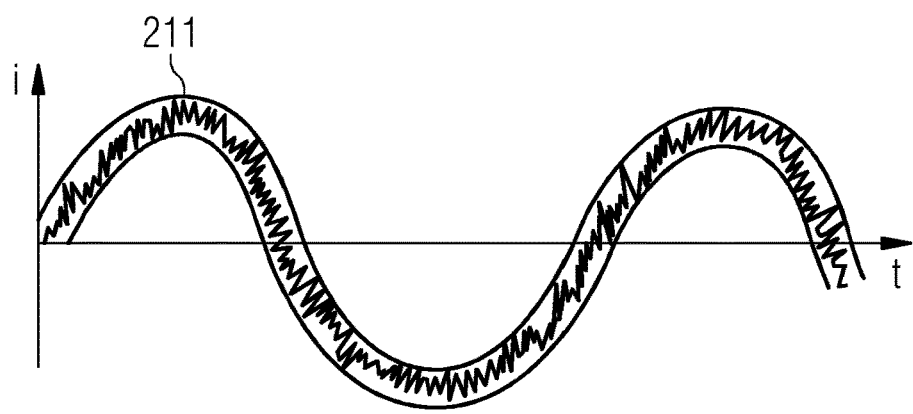
FIG. 5 is a schematic drawing showing a diagram illustrating an active filtering of an output of a first power converter in accordance with an embodiment of the invention.
Figure 5:
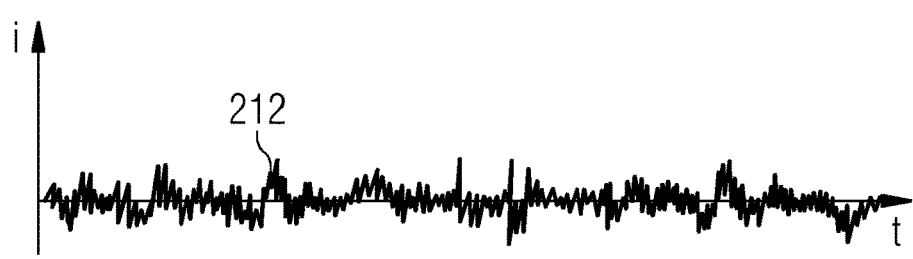
Figure 5:
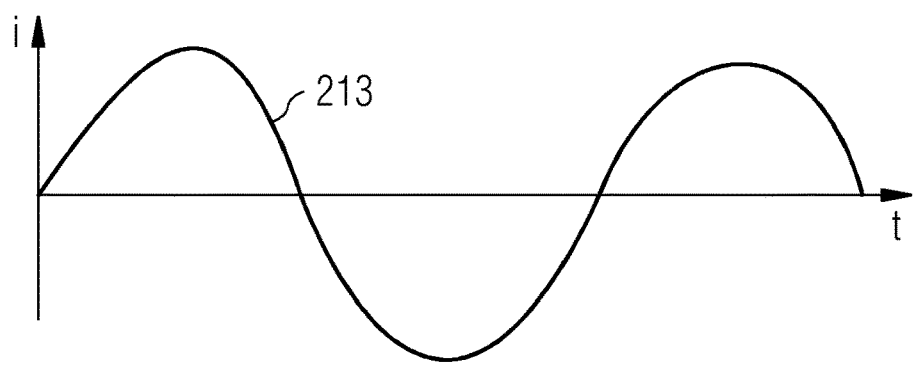

FIG. 5 illustrates schematically the output of the first power converter 10 (curve 211), the output of the second power converter 20 (curve 212) and the combined power output of the power conversion system 100 (curve 213) when operating in the second operating mode. In embodiments, the second power converter 20 operates as an active filter. In the second operating mode, the first power converter 10 may be operated below its nominal operating frequency, e.g., at a third switching frequency, for providing power conversion, resulting in the distortion in the generated waveform of the output power as illustrated with curve 211. The second power converter 20, operating as an active filter, outputs are compensating waveform 212 that compensates these disturbances that are due to the lower third switching frequency of the semiconductor switches of the first power converter 10. As can be seen in curve 213, the combination of the output 211 of first power converter 10 with the compensation waveform 212 of the second power converter 20 results in a cleaned waveform 213, which is provided as output of the power conversion system 100. Consequently, even though the first power converter 10 is operated at a lower third switching frequency, and the filters 41, 42 have a relatively small size insufficient to clean up the waveform 211, a high-quality power output may be achieved by power conversion system 100 by the active filtering provided in the second operating mode.

FIG. 6 illustrates a flow diagram of an exemplary method that may be performed by the power conversion system 100. In embodiments, the controller 30 may comprise a processor 31, which may be a microprocessor, a digital signal processor, an application specific integrated circuit, or the like, and a memory 32, which may be RAM, ROM, flash memory, a hard disc drive or the like. Memory 32 may comprise control instructions which, when executed by processor 31, perform the method illustrated in FIG. 6 or any of the methods disclosed herein. The controller 30 may be, may be associated with, or may be communicatively coupled to a converter controller of the first and second power converters.

In step S1, the power conversion system 100 is operated in a first operating mode, in which the first power converter 10 is inactive and the second power converter 20 is performing electric power conversion. Operation in this first operating mode may occur up to the conversion capacity limit of the second power converter 20. In step S2, it is checked if a setpoint of the power conversion system 100 exceeds the power converting capacity of the second power converter 20. The power setpoint may for example be an active and/or reactive power setpoint provided by a wind turbine controller. If the capacity is not exceeded in step S2, operation continues in step S1. If in step S2, the capacity of the second power converter is exceeded, operation transitions into the second operating mode in step S3. In the second operating mode, the first power converter is operated to perform electric power conversion. The second power converter 20 is operated to perform active filtering. As indicated above, the second power converter may also continue to perform electric power conversion, in particular if not all converter modules 24 of the second power converter 20 are required for providing the desired active filtering. As outlined in detail above, the switching frequency of the first power converter 10 can be relatively low in the second operating mode, as the active filtering compensates for the reduced power quality.

Operation in the second operating mode may continue until the power setpoint drops again to the power converting capacity of the second power converter 20. This is checked in step S4. If the power setpoint remains above the second power converter capacity, operation continues in step S3. Otherwise, operation continues with step S1, wherein the operation transitions again into the first operating mode.

Such operating method may achieve efficient power conversion by the power conversion system 100. As in the first operating mode, the wide bandgap semiconductor switches of the second power converter 20 are used for conversion, the conversion is efficient. Likewise in the second operating mode, since the first power converter 10 employing conventional semiconductor switches can be operated at a relatively low switching frequency, conversion efficiency is likewise improved. Further, and as outlined in detail above, the size of filters 41 to 52 may be reduced.

Particular advantages may arise when employing power conversion system 100 as a wind power converter. The generator of a wind turbine does often not provide nominal power, due to the variations in wind speed, so that a wind power converter often operates only at partial load. Consequently, the power conversion system 100 may operate for significant periods of time in the first operating mode, in which the wide bandgap semiconductor switches provide efficient power conversion. At the same time, it may not be necessary to rate the second power converter 20 for the nominal power of the generator, since at higher output powers of the generator, the second operating mode may be entered, in which the first power converter 10 provides efficient power conversion. Significant cost savings may thus be achieved. The use of parallel converters may in particular be more convenient for high power applications, such as 5 Megawatt or above, for example in DFIG or full converter topologies in wind turbine power systems. Further, by using plural converter modules in the first and second power converters 10, 20, the sizing of power conversion system 100 is flexible and adjustable in the design process. The modules may for example have the same size and may be configured correspondingly, so that a more economical and practical design of the power conversion system 100 may be achieved, for example in terms of tests and certification. Also, such configuration of power conversion system may provide redundancy and may thus improve reliability.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A power conversion system configured to provide electrical power conversion, comprising:
   a first power converter comprising power electronic switches of a first type that are switchable to provide electric power conversion, wherein the first power converter comprises a first back-to-back converter comprising a first intermediate DC bus;
   a second power converter connected in parallel to the first power converter wherein the second power converter comprises power electronic switches of a second type that are switchable to provide electric power conversion, wherein the second type is different from the first type, wherein the second type of power electronic switches comprises wide bandgap semiconductor switches, and wherein the second power converter comprises a second back-to-back converter comprising a second intermediate DC bus; and
   a controller configured to operate the power conversion system in a first operating mode in which the second power converter is operated at a first switching frequency of the power electronic switches to provide power conversion, and in a second operating mode in which the second power converter is operated at a second switching frequency of the power electronic switches and the first power converter is operated to provide power conversion, wherein the second switching frequency is higher than the first switching frequency, wherein the first back-to-back converter has a first converter unit and a second converter unit coupled by the first DC bus, and wherein the second back-to-back converter has a first converter unit and a second converter unit coupled by the second DC bus, wherein, in the second operating mode, the first converter unit of the second back-to-back converter provides active filtering for the first converter unit of the first back-to-back converter, and the second converter unit of the second back-to-back converter provides active filtering for the second converter unit of the first back-to-back converter.

2. The power conversion system according to claim 1, wherein the first power converter has a power converting capacity that is higher than a power converting capacity of the second power converter.

3. The power conversion system according to claim 1, wherein in the second operating mode, the power electronic switches of the first power converter are operated at a third switching frequency to provide the power conversion, wherein the third switching frequency is lower than the second switching frequency, and is lower than the first switching frequency.

4. The power conversion system according to claim 1, wherein the third switching frequency is lower than a nominal switching frequency of the first power converter.

5. The power conversion system according to claim 1, wherein the second switching frequency lies within a range of 5 kHz to 100 kHz, and/or wherein the first switching frequency lies within a range of 0.5 to 5 kHz.

6. The power conversion system according to claim 1, wherein in the first operating mode, all power conversion performed by the power conversion system is provided by the second power converter.

7. The power conversion system according to claim 1, wherein the second power converter comprises two or more converter modules connected in parallel, wherein in the second operating mode, at least one converter module of the second power converter is operated to provide active filtering of electric power converted by the first power converter, and at least one converter module of the second power converter is operated to provide electrical power conversion.

8. The power conversion system according to claim 7, wherein the converter module providing the active filtering in the second operating mode is operated at the second switching frequency, and wherein the converter module providing power conversion in the second operating mode is operated at the first switching frequency.

9. The power conversion system according to claim 8, wherein the controller is configured to change the operation of at least one converter module of the second power converter from power conversion at the first switching frequency to active filtering at the second switching frequency when changing from the first operating mode into the second operating mode.

10. The power conversion system according to claim 1, wherein the first DC bus of the first power converter is independent from the second DC bus of the second power converter.

11. The power conversion system according to claim 1, wherein the second power converter has a power converting capacity, wherein the controller is configured to operate the power conversion system in the first operating mode if a demand or a setpoint for power conversion by the power conversion system is not above the power converting capacity, and to operate the power conversion system in the second operating mode if the demand or the setpoint for power conversion by the power conversion system is above the power converting capacity.

12. The power conversion system according to claim 1, wherein the power electronic switches of the first type are Si-based power electronic switches, and/or wherein the power electronic switches of second type are SiC, GaN-, AlN-, BN- or ZnO-based power electronic switches.

13. A wind turbine electrical power system, comprising a power conversion system according to claim 1, wherein the power conversion system is configured to provide conversion of electrical power generated by a generator of the wind turbine electrical power system.

14. A method of operating a power conversion system, wherein the power conversion system comprises a first power converter comprising power electronic switches of a first type that are switchable to provide electric power conversion, wherein the first power converter comprises a first back-to-back converter comprising a first intermediate DC bus, and a second power converter connected in parallel to the first power converter, wherein the second power converter comprises power electronic switches of a second type that are switchable to provide electric power conversion, wherein the second type is different from the first type, wherein the second type of power electronic switches comprises wide bandgap semiconductor switches, and wherein the second power converter comprises a second back-to-back converter comprising a second intermediate DC bus, wherein the method comprises:

operating the power conversion system in a first operating mode in which the second power converter is operated at a first switching frequency of the power electronic switches to provide power conversion; and operating the power conversion system in a second operating mode in which the second power converter is operated at a second switching frequency of the power electronic switches and the first power converter is operated to provide power conversion, wherein the second switching frequency is higher than the first switching frequency, wherein the first back-to-back converter has a first converter unit and a second converter unit, and wherein the second back-to-back converter has a first converter unit and a second converter unit coupled by the second DC bus, wherein in the second operating mode, the first converter unit of the second back-to-back converter provides active filtering for the first converter unit of the first back-to-back converter, and the second converter unit of the second back-to-back converter provides active filtering for the second converter unit of the first back-to-back converter.

* * * * *